(12) United States Patent
Böhm et al.

(10) Patent No.: US 6,271,749 B1
(45) Date of Patent: Aug. 7, 2001

(54) SEMI-AUTOMATIC TRANSMISSION FOR MOTOR VEHICLES

(75) Inventors: Andreas Böhm, Wennigsen; Michael Wistrach, Braunschweig, both of (DE)

(73) Assignee: WABCO GmbH & Co. OHG, Hannover (DE)

( * ) Notice: Subject to any disclaimer, the term of this patent is extended or adjusted under 35 U.S.C. 154(b) by 0 days.

(21) Appl. No.: 09/583,117

(22) Filed: May 30, 2000

(30) Foreign Application Priority Data

Jun. 5, 1999 (DE) .............................................. 199 25 758

(51) Int. Cl.[7] ...................................................... B60Q 1/00
(52) U.S. Cl. ........................... 340/457; 340/453; 340/456; 340/425.5; 340/438; 340/459; 340/461
(58) Field of Search .................................... 340/457, 453, 340/438, 425.5, 456, 459, 461

(56) References Cited

U.S. PATENT DOCUMENTS

| 4,871,944 |   | 10/1989 | Takeda et al. | 340/457 |
|-----------|---|---------|---------------|---------|
| 4,871,994 | * | 10/1989 | Takeda et al. | 340/457 |
| 5,015,991 | * | 5/1991  | Barr          | 340/457 |
| 5,181,592 | * | 1/1993  | Pattock       | 192/4 A |
| 5,485,141 | * | 1/1996  | Gregory       | 340/457 |
| 5,581,233 | * | 12/1996 | Barr          | 340/457 |
| 6,052,637 |   | 4/2000  | Amsallen et al. | 701/51 |

FOREIGN PATENT DOCUMENTS

| 32 26 195   | 1/1988 | (DE) . |
| 197 46 149  | 5/1998 | (DE) . |
| WO 91/10220 | 7/1991 | (WO) . |

* cited by examiner

*Primary Examiner*—Jeffery Hofsass
*Assistant Examiner*—Hung Nguyen
(74) *Attorney, Agent, or Firm*—Proskauer Rose LLP

(57) ABSTRACT

A semi-automatic transmission for a vehicle having a diesel engine is provided which, upon start up of an engine ignition, goes through a warm up stage before the engine begins normal operation. An electronic controller is connected to the engine, a clutch, a gear box, and a signal transmitter. During start up of the engine, the electronic controller cause the signal transmitter to emit a signal which notifies the driver of the vehicle, based upon the position of an ignition key in the ignition lock, to disengage the clutch. Alternatively, during start up of the engine, the electronic controller detects whether the gear box is in a neutral position and whether the clutch is not disengaged. If the gear box is not in the neutral position or if the clutch is not disengaged, the electronic controller causes the signal transmitter to emit a signal which notifies the driver of the vehicle to disengage the clutch.

6 Claims, 3 Drawing Sheets

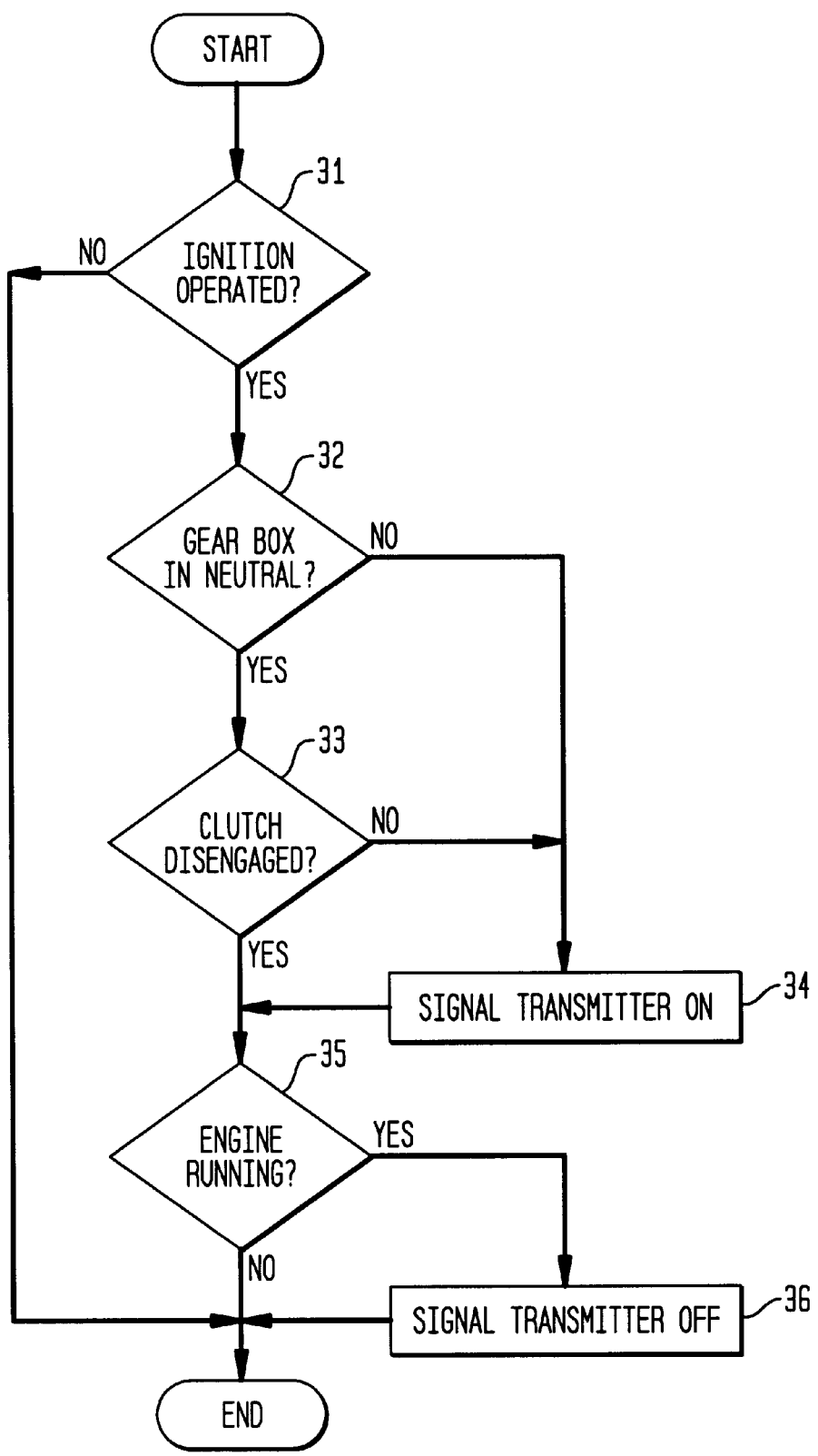

SEMI-AUTOMATIC TRANSMISSION FOR MOTOR VEHICLES

BACKGROUND OF THE INVENTION

The invention relates to a semi-automatic transmission for motor vehicles, in particular, for commercial vehicles with diesel engines.

Motor vehicles wit diesel engines are normally started so that the ignition key is first switched into a warm-up position. It is then necessary to wait for a certain period of time until the pre-warming process is completed. The ignition key is then turned further so that the electric starter of the engine is switched on. This starting procedure starts up the diesel engine and causes it to then run on at idle speed. In some vehicles, the starter is not actuated by the ignition key, but instead by a separate button.

A semi-automatic transmission is understood herein to be a transmission with a clutch to be actuated by a driver present within the vehicle. The gears are selected or pre-selected by means of an electric transducer, which may be in the form of a stepping switch. There is no mechanical connection between the transducer and the transmission. Instead, the switching signals are transmitted via electric cables ("shift by wire"). The driver receives no direct information from the transducer on whether a gear has currently been selected.

During the start up process described above, it is necessary for the transmission to be in the neutral position or for the clutch pedal to be pushed down, i.e., disengaged from the transmission. If the main clutch is engaged accidentally and a gear is selected during the engine start up procedure, dangers exist that the vehicle may suddenly jump, the motor may stall, or that the transmission may be damaged. The danger especially exists in a vehicle with a semi-automatic, shift by wire, transmission that the driver may not check the clutch and transmission positions before starting the engine.

It is an object of the present invention to avoid the dangerous situations heretofore described.

SUMMARY OF THE INVENTION

According to the present invention, a semi-automatic transmission for a vehicle having a diesel engine is provided which, upon start up of an engine ignition, goes through a warm up stage before the engine begins normal operation. An electronic controller is connected to the engine, the engine ignition, a clutch, a gear box, and a signal transmitter. During start up of the engine, the electronic controller causes the signal transmitter to emit a signal which notifies the driver of the vehicle to disengage the clutch. In one embodiment of the invention, the electronic controller detects the position of the engine ignition to determine when the engine is in the start up stage.

In a second embodiment of the present invention, during start up of the engine, the electronic controller detects whether the gear box is in a neutral position and whether the clutch is disengaged. If the gear box is not in the neutral position, or if the clutch is not disengaged, the electronic controller causes the signal transmitter to emit a signal which notifies the driver of the vehicle to disengage the clutch.

Although transmission controls with a warning display indicating the state of the clutch are disclosed, for example, in EP 0 884 212 A1 (U.S. Pat. No. 6,052,637, incorporated herein by reference), the present invention further uses the clutch display to warn the driver of the vehicle that the main clutch is not properly disengaged.

BRIEF DESCRIPTION OF THE DRAWINGS

FIG. 3 is a flow chart of the process in accordance with a second embodiment of the present invention.

DETAILED DESCRIPTION OF THE INVENTION

Figure 1:
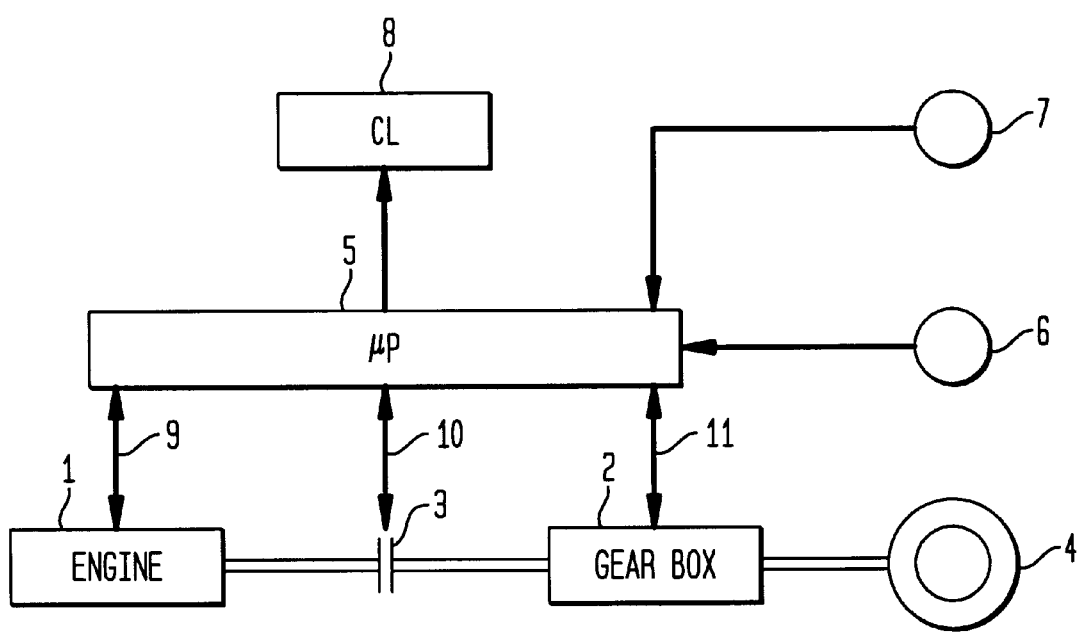
FIG. 1 schematically shows a semi-automatic transmission in accordance with the present invention.

FIG. 1 shows an engine 1 connected to a gearbox 2 via a main clutch 3. The gear box 2 is connected on the output side to drive wheels 4.

The gear box 2 is controlled by an electronic control system 5. The electronic control system 5, equipped with one or several microprocessors $\mu P$, receives information on the speed of the engine 1 via a first line 9. If necessary, the speed of the engine 1 can also be adjusted by control system 5 through the first line 9. The electronic control system 5 also receives information on the engagement status of the main clutch 3 via a second line 10. It is possible, for example, to determine by means of a sensor (not shown) whether the clutch 3 is engaged or disengaged. The electronic control system 5 further receives information, via a third line 11, as to the current gear status of the gear box 2 (actuated by an outside force). Gear switching commands can also be transmitted by the electronic control system 5 via the third line 11 to the gear box 2. Furthermore, input and output rotational speeds of the gear box 2 can be scanned via the third line 11.

The current condition of the clutch 3, i.e., whether the clutch is engaged or disengaged, can also be determined through the input and output speeds of the clutch 3, instead of with a costly additional sensor. The clutch 3 is considered to be engaged when both the input and output speeds are equal. In this case, however, the condition of the clutch can be checked only after the engine has been started.

The electronic control system 5 also receives information on the position of the ignition key in the ignition lock 6. The electronic control system 5 is also connected to a switching command transmitter 7 which can engage, or preselect, gears. The transmission control system 5 is also connected to a signal transmitter 8.

In a first embodiment of the invention, the transmission according to the present invention functions so that when the ignition has been switched on by the ignition key in the ignition lock 6, this is detected by the control system 5 which sends a signal to the signal transmitter 8 so that the driver of the vehicle is invited to actuate, i.e. disengage, the clutch 3. This takes place independently of the current state of the clutch 3 and gear box 2.

In a second embodiment of the invention, after ignition by turning of the ignition key in the ignition lock 6, the gear box 2 is monitored by the electronic control system 5 to determine whether the gear box 2 is in the neutral position and the clutch 3 is monitored to determine whether the clutch 3 is disengaged. If one of these is not the case, the electronic control system 5 causes the signal transmitter 8 to display an appropriate message. As a result, the driver of the vehicle is notified to actuate the clutch 3 after turning the ignition key. According to the second embodiment, this will only occur if the danger exists that the transmission is not in the neutral position or the clutch is not engaged.

The signal transmitter 8 is advantageously a display showing a non-blinking "CL" (clutch). It is, of course, possible instead to provide a warning light, a warning sound, or a blinking display as the signal transmitter. After the engine is started, the warning signal shuts off.

Figure 2:
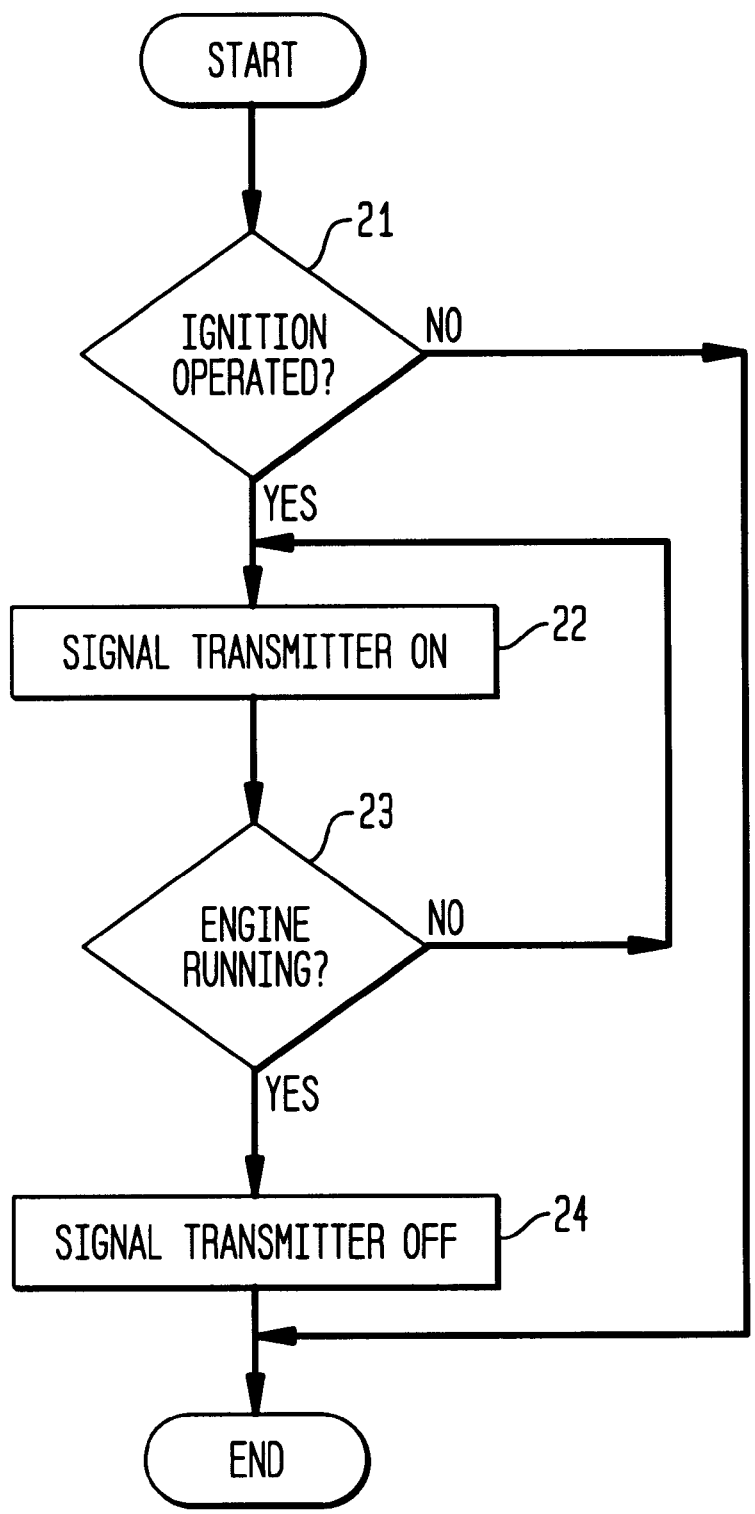
FIG. 2 is a flow chart of the process in accordance with a first embodiment of the present invention.

The first embodiment of the present invention is illustrated in the flow chart of FIG. 2. The control system determines whether the ignition has been switched on by the ignition key as illustrated in decision block 21. If it has, the control system sends a signal to the signal transmitter notifying the driver of the vehicle to actuate the clutch, as illustrated in decision block 22, before staring the engine. Once the engine is tuned on by turning the ignition key, illustrated in block 23, the signal transmitter turns off, as illustrated in block 24.

The second embodiment of the present invention is illustrated in the flow chart of FIG. 3. The control system determines whether the ignition has been switched on by the ignition key, illustrated in decision block 31. If it has, the control system then determines whether the gear box is in the neutral position, illustrated in block 32, and whether the clutch has been disengaged, illustrated in block 33. If either the gear box is not in the neutral position, or if the clutch has not been disengaged, the control system sends a signal to the signal transmitter notifying the driver of the vehicle to actuate the clutch, as illustrated in block 34, before starting the engine. Once the engine is running, the control system turns off the signal transmitter, as illustrated in blocks 35 and 36. If the control system determines that both the gear box is in the neutral position and the clutch is disengaged, the control system proceeds directly to block 35.

Having described preferred embodiments of the invention with reference to the accompanying drawing, it is to be understood that the invention is not limited to those precise embodiments, and that various changes and modifications may be effected therein by one skilled in the art without departing from the scope or spirit of the invention as defined in the appended claims.

What is claimed is:

1. A semi-automatic transmission for a commercial vehicle having a diesel engine which, upon start up, must go through a warm stage before the engine can be started, comprising:

an engine ignition key which initiates ignition, a gear box, a driver operable clutch disposed between the engine and the gear box, a signal transmitter, and an electronic controller connected to the ignition lock, the engine, the gear box, the clutch and the signal transmitter, wherein upon operating the ignition key, the electronic controller causes the signal transmitter to emit a signal which notifies a driver of the vehicle to disengage the clutch.

2. The semi-automatic transmission of claim 1 wherein the signal transmitter is a display.

3. The semi-automatic transmission of claim 2 wherein the signal emitted by the display comprises the letters CL.

4. A semi-automatic transmission for a commercial vehicle having a diesel engine which, upon start up, must go through a warm up stage before the engine can be started, comprising:

an engine ignition key which initiates ignition, a gear box, a driver operable clutch disposed between the engine and the gear box, a signal transmitter, and an electronic controller connected to the engine ignition, the engine, the gear box and the signal transmitter, wherein upon operating the ignition key, the electronic controller checks whether the gear box is in a neutral position and whether the clutch is disengaged, and wherein if the gear box is not in the neutral position or the clutch is not disengaged, the electronic controller causes the signal transmitter to emit a signal which notifies a driver of the vehicle to disengage the clutch.

5. The semi-automatic transmission of claim 4 wherein the signal transmitter is a display.

6. The semi-automatic transmission of claim 5 wherein the signal emitted by the display comprises the letters CL.

* * * * *